Feb. 25, 1936. H. D. STEVENS 2,032,073
APPARATUS FOR TREATING PLASTIC MATERIAL
Filed April 10, 1933 2 Sheets-Sheet 2
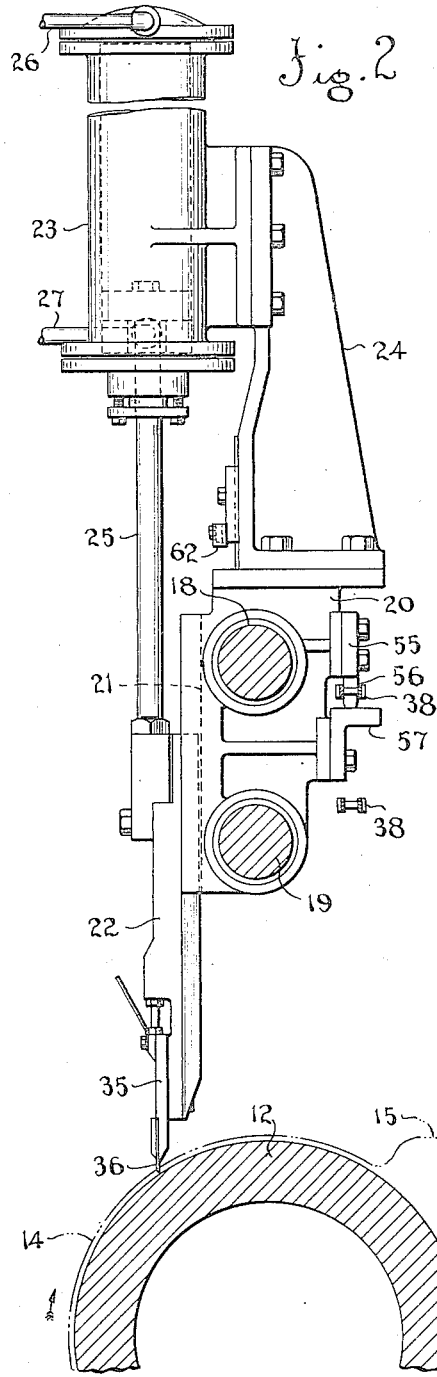
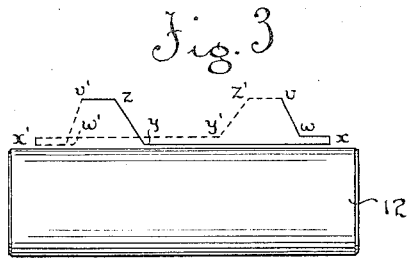
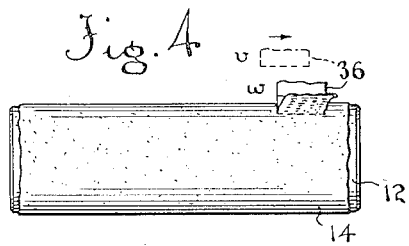
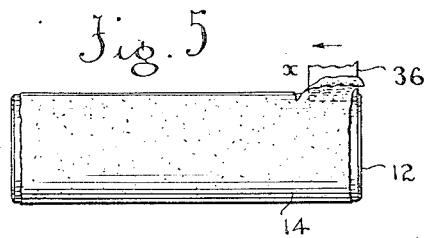
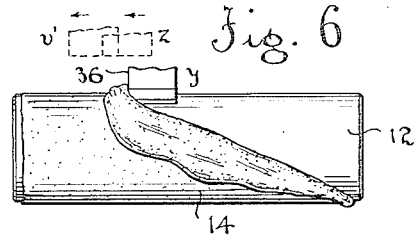
Inventor
Horace D. Stevens
By
Attorneys Patented Feb. 25, 1936

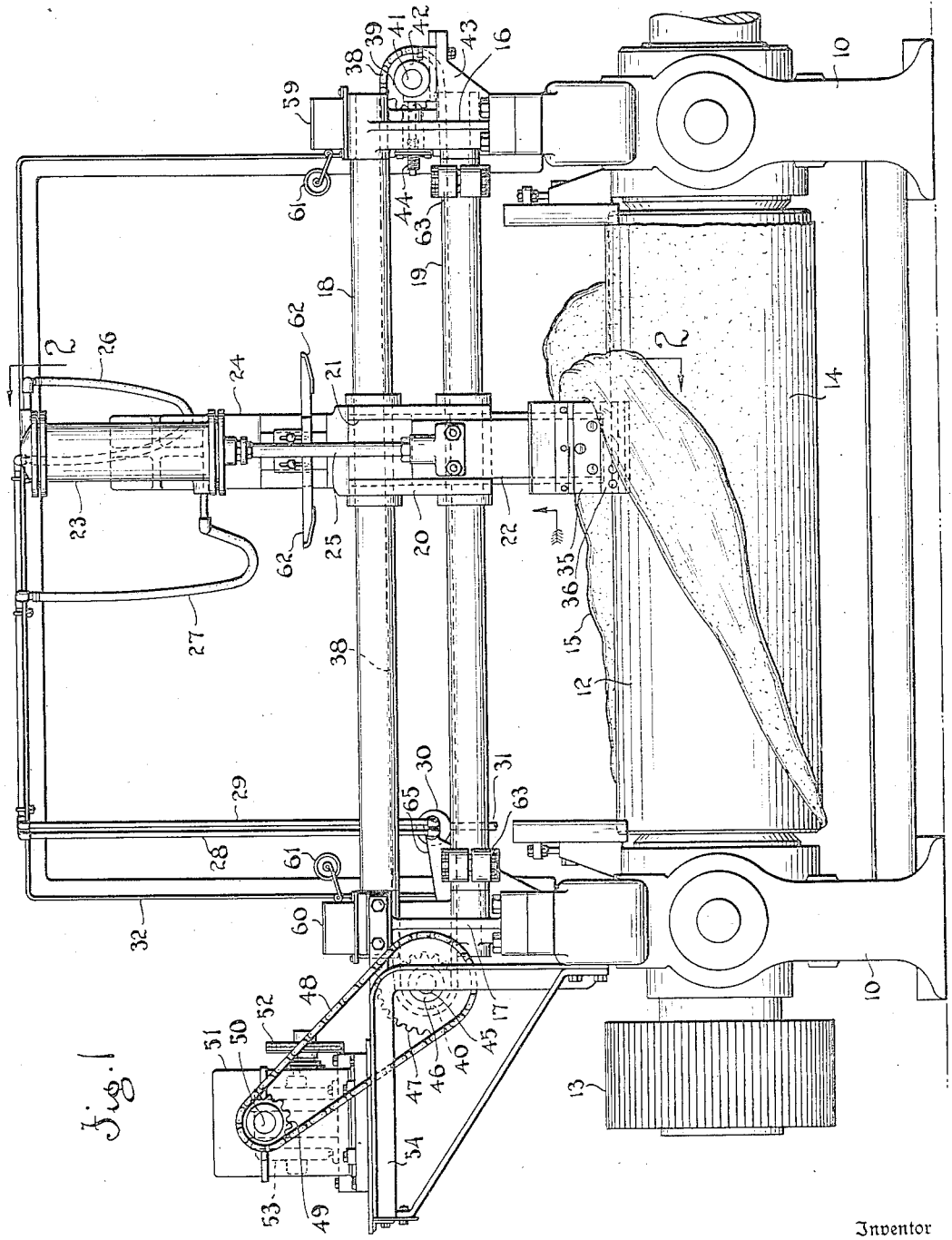

2,032,073

UNITED STATES PATENT OFFICE 2,032,073

APPARATUS FOR TREATING PLASTIC MATERIAL

Horace D. Stevens, Akron, Ohio, assignor to The Firestone Tire & Rubber Company, Akron, Ohio, a corporation of Ohio Application April 10, 1933, Serial No. 665,308

10 Claims. (Cl. 18—2)

This invention relates to apparatus for treating plastic material, and more especially it relates to rubber-working apparatus, such as mixing mills and warming mills, comprising automatically operating mechanism for stripping the plastic sheet of material from one of the mill rolls and feeding it back into the bite of the rolls, whereby a more intimate mixing of the material is effected, or the warming thereof expedited.

The chief objects of the invention are to provide, in a rubber-working mill, improved mechanism for stripping the plastic rubber composition from a mill roll and then feeding it back into the bite of the mill rolls. Another object is to devise mechanical rubber-mixing apparatus which will mix the rubber more thoroughly and uniformly than the manual method. A more specific object is to provide for so moving the work-stripping member relatively of the mill roll that improved operation is achieved. A further object is to provide a single member for scraping rubber composition from a mill roll and feeding it back into the mill, which scraper may be movable longitudinally of a mill roll in both directions, and operably engage said roll while moving in both directions. Other objects will be manifest.

The foregoing and other objects are achieved in the present invention which comprises broadly a two-roll mill, a work-scraper adapted to engage the surface of one of the mill rolls, and means for moving the scraper relatively of the mill roll in a determinate course which comprises first moving the scraper into engagement with the mill roll at a point near but spaced from one end of the roll, then moving it to the near end of the roll, then reversing its course and moving it toward the opposite end of the roll, and then removing it from the roll before the opposite end is reached, all of said movements occurring in a plane parallel to the axis of the mill roll. The initial movement of the scraper toward the end of the roll is of sufficient duration and extent to permit the scraper completely to penetrate the thick sheet of plastic material thereon, so that the reverse movement of the scraper progressively scrapes and strips the material from the roll from one end thereof toward the other end, the stripped material rolling upon itself or arranging itself in folds upon the surface of the rotating roll, and then passing endwise into the bite of the rolls after the scraper is lifted, at the conclusion of the cycle of operation, near the opposite end of the roll. The operation described is continuous, and is repeated, first at one end of the mill roll and then at the other end.

Of the accompanying drawings:

Figure 1 is a front elevation of apparatus embodying the invention, in its preferred form;

Figure 2 is a section on the line 2—2 of Figure 1, showing a roll-scraper device in side elevation;

Figure 3 is a diagrammatic view showing the course of the scraper with relation to a mill roll;

Figure 4 is detail elevation of a mill roll showing the scraper as it initially engages the same;

Figure 5 is a view similar to Figure 4 showing the scraper at the position where its direction of movement on the mill roll is reversed; and Figure 6 is a view similar to Figures 4 and 5 showing the extreme position of the scraper before it moves out of engagement with the mill roll.

Referring to Figures 1 and 2 of the drawings, there is shown a rubber-working mill comprising end-frames 10, 10 in which are journaled a pair of laterally disposed, horizontal rolls 11, 12, that are geared together as by gears such as that shown at 13, Figure 1, and driven in unison by the usual driving means (not shown). The rolls 11, 12 are adapted to form a sheet 14 of plastic composition from a bank 15 of such composition that is fed into the bite between said rolls, the sheet 14 being shown herein as being formed on the front roll 12.

Mounted upon the top of end frames 10 are respective brackets 16, 17 that carry a pair of guide-bars 18, 19 that are parallel to each other and to roll 12 and are disposed in a vertical plane with the latter. The guide-bars 18, 19 slidably support a carriage 20 that is movable longitudinally thereof, and the front face of said carriage is formed with a vertical dove-tail slideway 21 in which is mounted a slide 22. Vertical movement of the slide 22 is effected by means of a superposed vertically positioned, double-acting, fluid-pressure operated cylinder 23 that is carried by a bracket 24 that is mounted upon the carriage 20, the piston rod 25 of cylinder 23 extending downwardly and having its outer end connected to the upper end of said slide. Fluid pressure is supplied to the upper and lower ends of cylinder 23 through flexible hose or pipes 26, 27 respectively, that constitute extensions of respective rigid pipes 28, 29 that are connected to a control valve 30, the latter being provided with a supply pipe 31 extending to any suitable source of pressure fluid (not shown), and with the usual exhaust port (not shown).

A light frame 32 may be provided for supporting the pipes 28, 29. The lower end of slide 22 carries an adjustable holder 35 for a scraper blade 36 that engages the surface of mill roll 12, on the upwardly moving side thereof, when the slide 22 is in lowered position as is most clearly shown in Figure 2. Said scraper blade 36 is rectangular in shape and has at least one of its longitudinal margins sharpened, the end margins of the blade being unsharpened and blunt. It is the sharpened margin of the blade that engages the mill roll. For moving the carriage 20 longitudinally of the guide-bars 18, 19, whereby the scraper 36 is moved longitudinally of roll 12, there is provided an endless sprocket chain 38 that is trained about a pair of sprockets 39, 40 positioned at opposite ends of the mill. As is most clearly shown in Figure 1, the sprocket 39 is mounted upon an idler shaft 41 that is journaled in a bearing bracket 42, the latter being mounted upon a lateral extension 43 of the bracket 16. An adjusting screw 44 is threaded through bracket 16 and engages bracket 42 for the purpose of tightening or loosening sprocket chain 38. The sprocket 40 is mounted upon a driven shaft 45 that is journaled in a laterally-extending bearing structure 46 formed on the bracket 17. Both ends of shaft 45 extend beyond said bearing structure, and one end thereof carries a sprocket 47 that is connected by a sprocket chain 48 to a sprocket 49 on shaft 50 of a reduction gear device 51, the latter being driven by a sprocket chain 52 connected to a reversible motor 53. The motor 53 and reduction gear device 51 are mounted upon a framework 54 carried by one of the end frames 10 of the mill. The carriage 20 is connected to sprocket chain 38 by means of a plate 55 that has its lower margin formed with a plurality of teeth, such as the tooth 56, Figure 2, which teeth extend through respective links of said sprocket chain and abut a retaining plate 57, both plates 55 and 57 being secured to the rear face of carriage 20.

The arrangement is such that the carriage 20 is propelled longitudinally of the guide-bars 18, 19 when the reversible motor 53 is driven. The direction of rotation of the motor 53 is controlled by respective reversing switches 59, 60 that are mounted upon the tops of brackets 16, 17, each of said switches being provided with an operating lever 61 extending toward the carriage 20. The latter is provided with adjustable oppositely projecting fingers 62, 62 adapted to engage the respective switch levers 61 to operate switches 59 or 60 whenever the carriage 20 approaches the respective ends of guide-bars 18, 19, thereby reversing motor 53 to cause the carriage to move in the opposite direction. Adjustable positive stops 63, 63 are mounted upon guide-bar 19 to prevent over-run of the carriage 20 in either direction.

The reciprocating movements of the carriage 20 along the guide-bars 18, 19, and the up and down movements of the slide 22 on said carriage occur in determinate timed relation to each other whereby the previously described movements of the scraper 36 with relation to the mill roll 12 are effected. To this end suitable means is provided for the operation of the valve 30 hereinbefore described, said valve being mounted upon a bracket 65. The specific form of the valve operating and timing means is not disclosed herein, however, as it forms no part of the present invention. When the valve 30 is operated in one direction, fluid pressure passes from pipe 31 into pipe 29, thence to the lower end of cylinder 23 to raise the scraper 36. When the valve is operated in the opposite direction, the fluid pressure passes into pipe 28, thence to the upper end of cylinder 23 to lower the scraper 36.

The various movements of the scraper 36 with relation to mill roll 12 are diagrammatically illustrated in Figure 3. The course shown in full lines and designated by characters v, w, x, y and z is a complete cycle of operation at one end of the roll, and the course shown in broken lines and designated v' to z' inclusive, is a complete cycle of operation at the other end of the roll, which brings the scraper back to the point of starting of the first cycle. The upwardly and downwardly moving phases of the scraper's movements, such as are indicated by lines v, w and y, z are necessarily oblique because the motor 53 is continuously moving the scraper longitudinally of the roll.

A cycle of operation may be assumed to start at point v, Figure 3, the scraper 36, which is continuously reciprocated longitudinally of roll 12, by the motor 33, then being in the broken line position shown in Figure 4. When fluid pressure passes through pipe 28 to the top of cylinder 23 and causes scraper 36 to descend into engagement with roll 12 at point w, Figures 3 and 4, the scraper 36 then moves from point w to point x, Figures 3 and 5, at which point switch 60 is operated to reverse the direction of longitudinal movement of carriage 20. After the scraper traverses the roll 12 to position y, the valve is operated to the position that admits fluid pressure through pipe 29 to the lower end of cylinder 23, and vents fluid from the top thereof, thus causing scraper 36 to rise. The rising movement of the scraper starts when it is in position y longitudinally of roll 12, and terminates at position z, as is most clearly shown in Figures 3 and 6. The scraper 36 remains in raised position from point z to point v'. This completes a cycle of operation of the scraper on one end of roll 12.

Valve 30 is then operated to reverse the pressure in cylinder 23 and the scraper is again lowered to initiate a cycle of operation on the other end of roll 12, which cycle is identical with the cycle just described, and is indicated in Figure 3 by points v" and z' inclusive, the scraper returning to the point of starting the first cycle.

It will be seen that the scraper 36 always is fixedly positioned in a plane parallel to the axis of the roll 12, and operates against the roll in the same manner while moving in either direction longitudinally thereof. In each case the scraper, after forcing and cutting its way through the sheet of material 14 during its initial downward and lateral movement toward one end of the roll, reverses its direction and moves toward the opposite end of the roll, forcing its way through the sheet 14 and piling it up somewhat at its leading edge, as clearly shown in Figure 1, and laying the stripped material in convolutions or folds that are disposed obliquely of the roll. When the scraper rises, the fold of scraped material passes substantially lengthwise into the bite of rolls 11, 12 whereby intimate mixing of the ingredients thereof is effected.

The apparatus is fully automatic in its operation, requires the use of but a single scraper, and achieves the other advantages set out in the foregoing statement of objects.

Modification may be resorted to without departing from the spirit of the invention or the scope of the appended claims, which are not limited wholly to the specific construction shown and described.

What is claimed is:

1. In apparatus for treating plastic material, the combination of a mill comprising rolls for forming a thick sheet of the material on one of the rolls thereof, a scraper movable longitudinally of said roll for removing material therefrom, said scraper presenting a blunt leading surface to the material to cause the latter to pile up in front of said surface during the said movement of the scraper, and means for moving said scraper out of and into engagement with said mill roll at points intermediate the ends thereof.

2. In apparatus for treating plastic material, the combination of a mill comprising rolls for forming a thick sheet of the material on one of the rolls thereof, a scraper for removing material from said mill roll, and means for moving the scraper relatively of the mill roll in the following course, to wit, moving it into engagement with the roll at a point near but spaced from the end of the latter, moving it to the near end of the roll, reversing its direction and moving it toward the opposite end of the roll, and then removing it from the roll at a point somewhat short of said opposite end.

3. In apparatus for treating plastic material, the combination of a mill comprising rolls for forming a sheet of material on one of the rolls thereof, a scraper for removing material from said mill roll, means for continuously moving said scraper from one end of said mill roll to the other, and means timed therewith for raising the scraper from and lowering it onto the mill roll, the scraper initially engaging the roll somewhat before reaching the end thereof toward which it is moving.

4. In apparatus for treating plastic material, the combination of a mill comprising rolls for forming a sheet of material on one of the rolls thereof, a scraper for removing material from said mill roll, means for continuously moving said scraper from one end of said mill roll to the other and back again, and a pressure cylinder timed with said last mentioned means for moving the scraper into and out of engagement with the mill roll.

5. In apparatus of the character described, the combination of a pair of driven mill rolls, a scraper consisting of a flat blade rigidly supported in a plane parallel to the axis of said mill rolls and having a margin of substantial length positionable flush with the surface of one of said rolls, and means for moving said scraper, in said plane, in opposite directions in engagement with one of said mill rolls.

6. In apparatus of the character described, the combination of a pair of driven mill rolls, a scraper comprising a rectangular blade disposed in a plane parallel to the axis of said mill rolls and adapted to be brought into engagement with one of said rolls, said blade having blunt end portions rising from the surface of said mill roll when said blade is in engagement therewith, and means for moving said scraper in opposite directions in its own plane, longitudinally of said mill roll, whereby said scraper may remove a portion of a sheet of material on said mill roll and one of said end portions will move into engagement with the portion of the sheet of material so removed from the roll for gathering or rolling said material upon itself preparatory to feeding the material back in between the mill rolls, and upon movement of the scraper in the opposite direction, the other end portion of said scraper will engage the material removed from the mill roll for the purpose specified.

7. In apparatus for treating plastic material, the combination of a mill comprising driven rolls for forming a sheet of the material on one of the rolls thereof, a scraper for removing material from said mill roll, means for moving said scraper into engagement with the surface of one end portion of said mill roll by cutting through the material on said end portion, means for moving said scraper along said mill roll toward the middle thereof for progressively cutting and rolling said material upon itself and piling it up in front of the leading edge of the scraper, and means for withdrawing said scraper from said mill roll intermediate the ends thereof to permit the rolled material to be drawn back between said driven rolls, said scraper and said means being constructed and arranged to operate in like manner from the opposite end portion of said mill roll.

8. In apparatus of the character described, the combination of a mill having cooperating rolls and means for rotating the same adapted to form a sheet of plastic material on one of said rolls, and a scraper movable longitudinally of the said roll in contact therewith to remove material therefrom, said scraper presenting a blunt leading surface to the material on the roll so as to pile up material in front of said leading surface.

9. A mill for plastic material having cooperating rolls and means for rotating said rolls, in combination with a flat rectangular blade, and means for moving said blade longitudinally of one of said rolls with one margin of the blade flush with the surface of said roll, the adjacent leading margin of the blade being blunt to pile up the material in front of it.

10. A mill for plastic material having cooperating rolls and means for rotating said rolls to form a sleeve of plastic material on one of them, in combination with a rectangular scraper having a cutting edge and adjacent blunt edges, means for moving said scraper toward a mill roll with its cutting edge foremost so as to penetrate the material on said roll, and means for moving the scraper laterally, longitudinally of the roll, to strip material from the roll by piling it up in front of the leading edge of the scraper.

HORACE D. STEVENS.